United States Patent [19]
Lee

[11] Patent Number: 5,884,721
[45] Date of Patent: Mar. 23, 1999

[54] BUTTON SHIFT TRANSFER SYSTEM FOR A FOUR-WHEEL DRIVE VEHICLE

[75] Inventor: Jong-hyun Lee, Kwangmyng, Rep. of Korea

[73] Assignee: Kia Motors Corp., Seoul, Rep. of Korea

[21] Appl. No.: 768,082

[22] Filed: Dec. 16, 1996

[30] Foreign Application Priority Data

Sep. 11, 1996 [KR] Rep. of Korea ................. 1996-39366

[51] Int. Cl.⁶ .................................................. B60K 23/08
[52] U.S. Cl. .......................................... 180/247; 180/233
[58] Field of Search ..................................... 180/233, 247, 180/24.1; 701/69

[56] References Cited

U.S. PATENT DOCUMENTS

| | | | |
|---|---|---|---|
| 4,664,217 | 5/1987 | Welch et al. ............................ | 180/247 |
| 4,915,189 | 4/1990 | Sakai ....................................... | 180/247 |
| 5,105,900 | 4/1992 | Adler et al. ............................. | 180/247 |
| 5,199,325 | 4/1993 | Reuter et al. ........................... | 180/233 |
| 5,323,871 | 6/1994 | Wilson et al. .......................... | 180/247 |
| 5,330,030 | 7/1994 | Eastman et al. ........................ | 180/247 |
| 5,363,938 | 11/1994 | Wilson et al. .......................... | 180/247 |
| 5,411,110 | 5/1995 | Wilson et al. .......................... | 180/247 |

*Primary Examiner*—Brian L. Johnson
*Assistant Examiner*—Gary Savitt

[57] ABSTRACT

A transfer system for a four-wheel drive vehicle comprising: a transfer case for transferring driving modes; a transfer-operating part for activating and controlling said transfer; a button shifting assembly for selecting driving mode; a speed sensor for detecting a vehicle speed; a neutral switch which switches on when a transmission mode is neutral; and an electronic control unit which controls the transfer-operating part regarding the vehicle speed, the transmission mode sensor and the button shifting assembly.

3 Claims, 4 Drawing Sheets

Fig. 3A
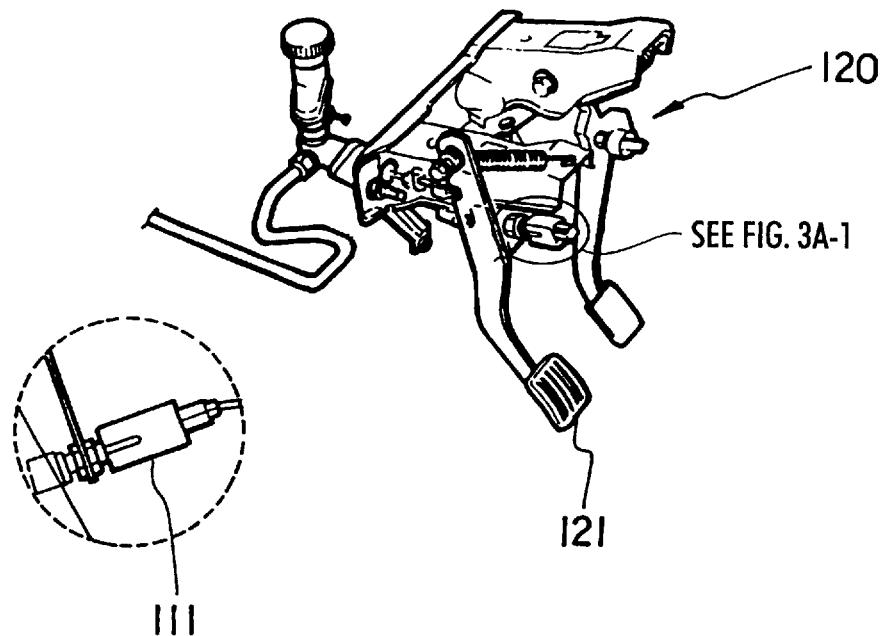
Fig. 3A-1
Fig. 3B
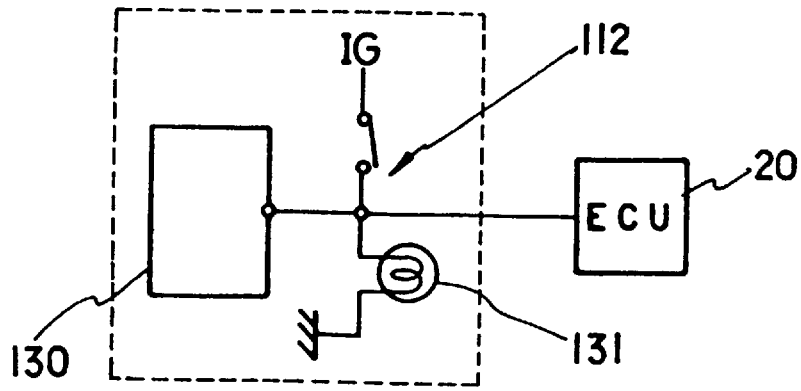

5,884,721

BUTTON SHIFT TRANSFER SYSTEM FOR A FOUR-WHEEL DRIVE VEHICLE

TECHNICAL FIELD

This invention relates to a four-wheel drive vehicle and more particularly to a button type four-wheel drive system which can reduce transfer shock.

BACKGROUND ART

Four-wheel drive systems are designed to provide both two-wheel drive and four-wheel drive as needed or desired. The four-wheel-drive system, in addition to the conventional rear two-wheel drive, requires the following additional components: a transfer case mounted at the rear of an automatic or manual transmission; a front-drive differential and axles; a front drive shaft; and front-drive-wheel locking hubs.

Two basic types of four-wheel-drive designs are used-part time and full time. With the full-time four-wheel drive, the driver can select two- or four-wheel-drive from the driver's seat. This invention relates to a four-wheel-drive vehicle which selectively transfers between two- and four-wheel-drive.

As shown in FIG. 1, a button type part time four wheel drive has a button assembly 10 for selecting driving type; a controller 20, i.e., an electric control unit (hereinafter "ECU"); and a transfer case 30 activated by solenoids 40 and actuators 50 controlled by the ECU 20. Reference number 70 indicates a power supply operated by engine negative pressure.

The transfer case 30 is connected to the transmission 60 which enables the engine 80 to propel the vehicle under various loads and has a fixed connection with one of the drive axles 61 or 62 and selectively meshes with the other drive axle 62 or 61, respectively, by the activation of the actuators 50 and solenoids 40.

The ECU 20 determines transfer from 4-wheel drive to 2-wheel drive or vice versa regarding vehicle speed. That is, ECU permits a specific transfer only when the vehicle speed which can be informed by a speed sensor 100 is below a predetermined value.

The ECU 20 for transferring drive mode among 4*4H (four wheel drive-high speed), 4*4L (four wheel drive-low speed), and 4*2H (two wheel drive-high speed) is controlled by a button assembly 10.

Since transfer is designed to be achieved even while a clutch (not shown) between the engine 80 and the transmission 60 is being engaged, drivers experience a transfer shock, especially transferring the drive type from 4*2H to 4*4H, which is because speed limit for transferring from 4*2H to 4*4H is higher than for transferring between 4*2H and 4*4L, and between 4*4L and 4*4H.

That is, according to the conventional transfer logic the ECU 20 permits transfer from 4*2H to 4*4H even when vehicle speed is relatively high.

SUMMARY OF THE INVENTION

The present invention has been made to solve the above described problems of the conventional transfer system.

Therefore, it is an object of the present invention to provide a transfer system for a four-wheel drive vehicle which can reduce a transfer shock during transfer.

To achieve the above object, the present invention provides a transfer system for a four-wheel drive vehicle comprising: a transfer case for transferring driving modes; a transfer-operating part for activating and controlling the transfer case; a means for selecting driving mode; a speed sensor for detecting vehicle speed; a neutral switch for detecting whether the transmission mode is neutral; and an electronic control unit that controls the transfer-operating part based on the vehicle speed and transmission mode and signal from the means for selecting driving mode.

It is another feature of the present invention that the means for selecting driving mode is a button assembly having a plurality of buttons, each of which defines a specific driving mode.

It is still another feature of the present invention that the electronic control unit permits a specific transfer-driving mode when the transmission mode is neutral.

BRIEF DESCRIPTION OF THE ACCOMPANYING DRAWINGS

The foregoing and other objects of the present invention will become more apparent from the detailed description below when taken in conjunction with the following drawings in which:

FIGS. 3A and 3A-1 are a schematic of a clutch switch for the. transfer system for a four-wheel drive vehicle of FIG. 2;

FIG. 3B is a schematic of an N-range switch for the transfer system for a four-wheel drive vehicle of FIG. 2.

DETAILED DESCRIPTION OF THE PREFERRED EMBODIMENT

The preferred embodiment of the present invention will now be described in detail with reference to the accompanying drawings.

Figure 1:
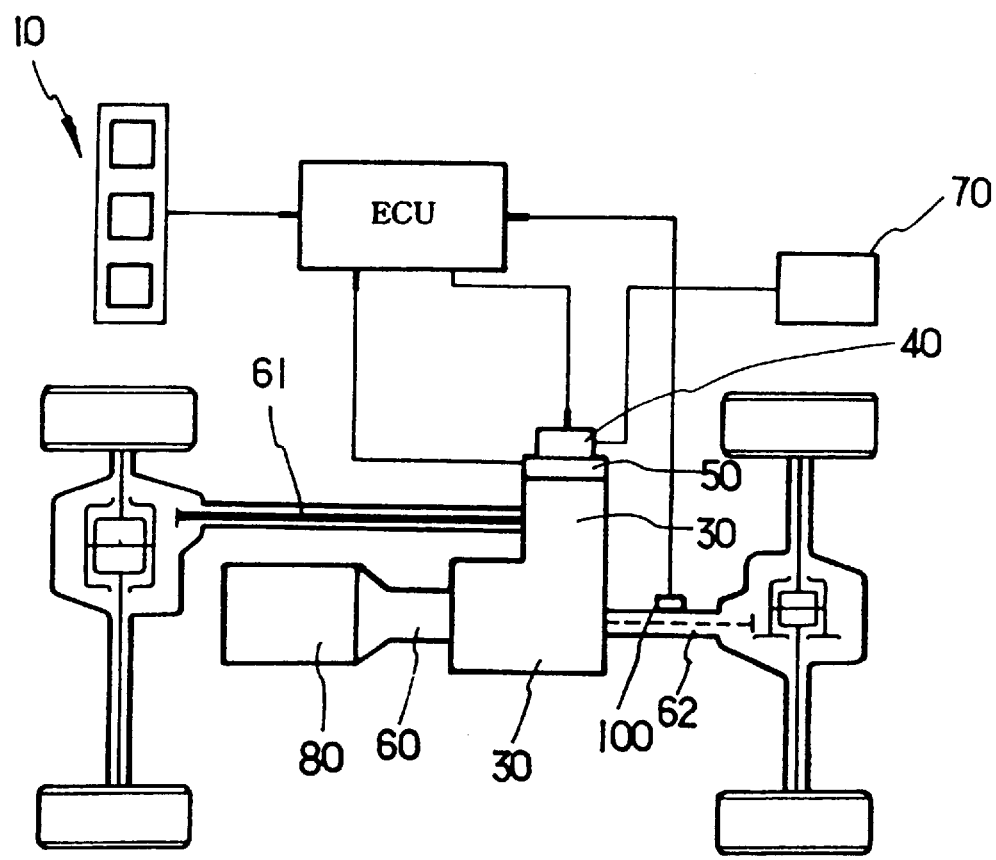
FIG. 1 is a block diagram of a conventional part time four-wheel drive system for a vehicle.
Figure 2:
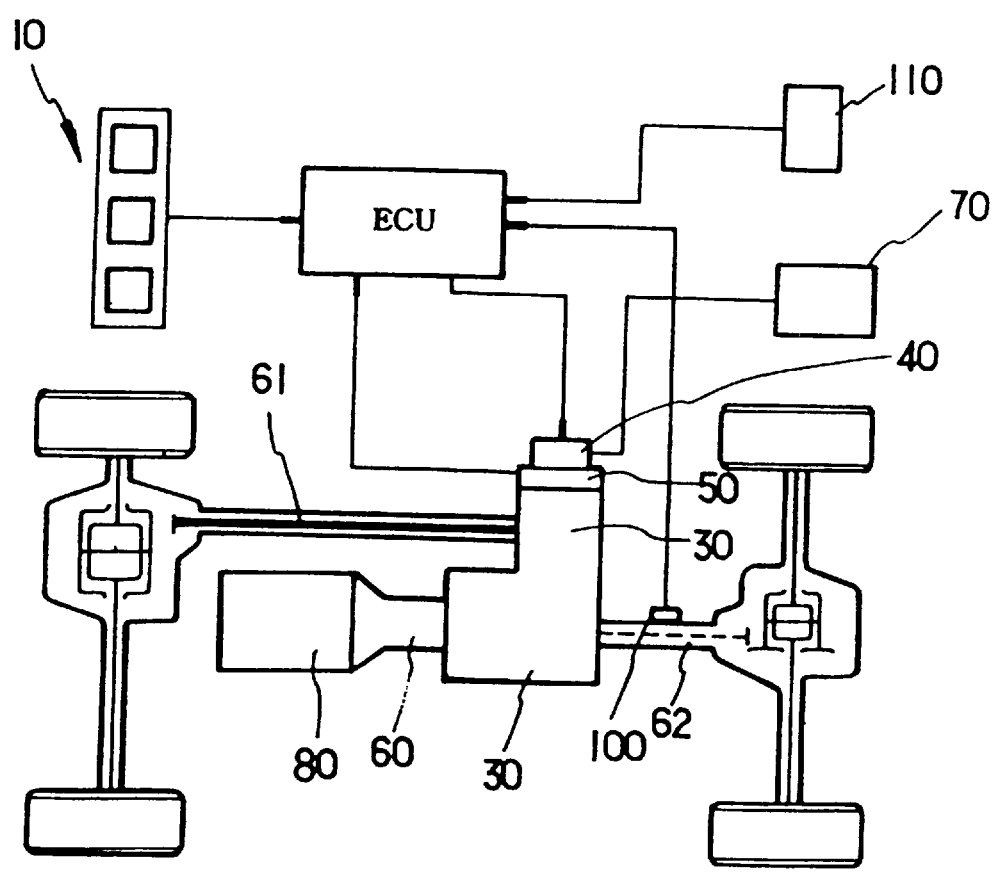
FIG. 2 is a block diagram of a transfer system for a four-wheel drive vehicle according to an embodiment of the invention.

As shown in FIG. 2, the inventive transfer system of the embodiment further includes a neutral switch 110, which may be a clutch switch 111 (shown in FIG. 3A) in a manual transmission vehicle or an N-range switch 112 (shown in FIG. 3B) in an automatic transmission vehicle. That is, the neutral switch 110 defines a clutch switch 111 for a manual transmission vehicle or an N-range switch 112 for an automatic transmission vehicle in this specification. The other parts of the transfer system of the embodiment are unchanged in comparison with the conventional transfer system, shown in FIG. 1.

The clutch switch 111 or an N-range switch 112 is for detecting whether the driving force of the engine 80 is being delivered to the transmission 60 and for informing the ECU 20 of the transmission mode.

The clutch switch 111 which is already used for starting engine 80 is mounted on a clutch assembly 120 located proximate to a clutch pedal 121 as shown in FIG. 3A.

The N-range switch 112 is connected to a TCU ("transmission control unit") 130 of an automatic transmission vehicle, the signal of which is transmitted to the N-range switch 112 and may be transmitted to an indicator 131 which indicates the transmission mode in a dash panel (not shown), as shown in FIG. 3B.

The mounting positions of the clutch or the N-range switches 111 or 112 are not limited in this invention.

Figure 4:
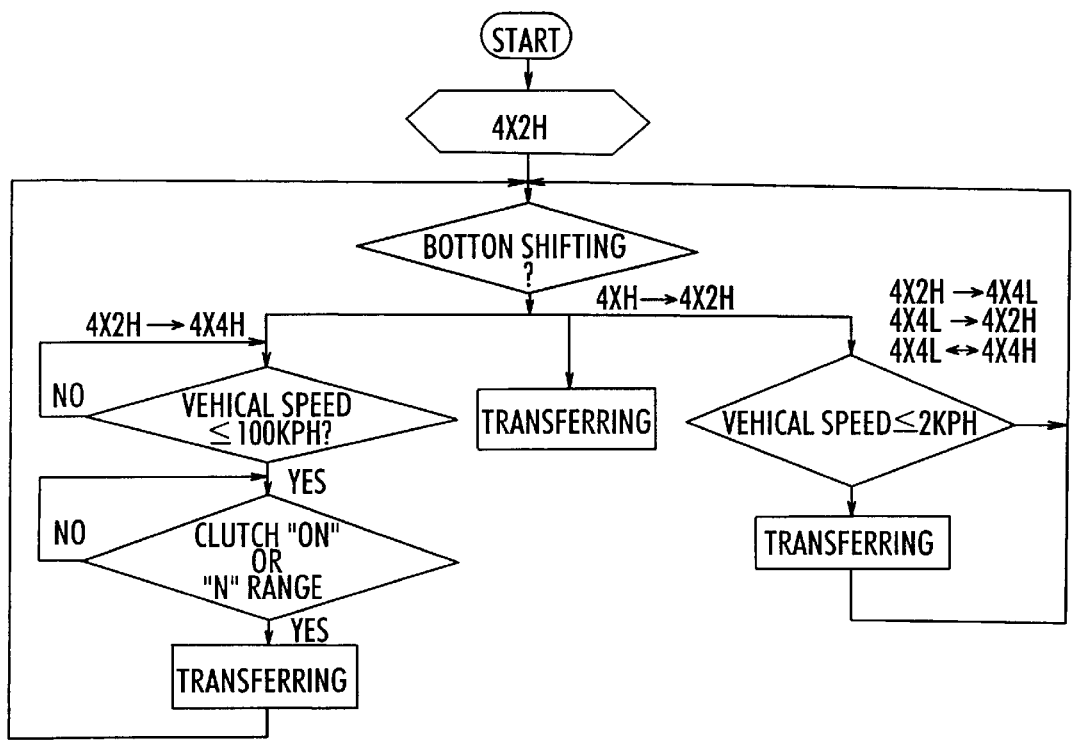
FIG. 4 is a flow chart illustrating operation of the transfer system for a four-wheel drive vehicle according to an embodiment of the invention.

The operation will now be explained with reference to FIG. 4. The four wheel drive vehicle of this embodiment starts in an initial driving condition, that is, 4*2H driving condition.

If-button shifting from 4*2H to 4*4H is done, the ECU 20 confirms the vehicle speed from the vehicle speed sensor, and the transmission mode from neutral sensor 110, namely, clutch switch 111 or N-range switch 112. If the two conditions of vehicle speed and transmission mode are satisfactory, the transfer is permitted. That is, in order to transfer driving mode from 4*2H to 4*4H, vehicle speed must be less than a certain value for example 100 KPH (kilometers per hour) and the transmission mode must be neutral. If any of these two conditions are not satisfactory, the transfer cannot be accomplished.

The transfer from 4*4H to 4*2H can be done without any condition. That is, the speed limit or any other conditions are not necessary for the transfer.

If the transfer is one not from 4*2H to 4*4H or not from 4*4H to 4*2H, only the vehicle speed condition is considered. That is, the transfers between 4*4H and 4*4L, and between 4*4H and 4*4L are accomplished considering only vehicle speed, for example less than 2 KPH.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A transfer system for a four-wheel drive vehicle comprising:

means for selecting a driving mode;

a transfer case for transferring the driving mode;

a transfer-operating part for activating and controlling said transfer of the driving mode;

a transmission mode sensor for sensing the driving mode;

a speed sensor for detecting a speed of the vehicle;

a neutral switch which switches on when a transmission mode is neutral; and an electronic control unit which controls said transfer-operating part based on the vehicle speed, the transmission mode sensor and the driving mode and permits the transfer from 4*2H drive to 4*4H drive only when the transmission mode is neutral.

2. The transfer system of claim 1, wherein said means for selecting driving mode is a button assembly having a plurality of button switches respectively defining a special driving mode.

3. The transfer system of claim 1, wherein said neutral switch is a clutch switch or an N-range switch.

* * * * *